United States Patent Office 3,651,018
Patented Mar. 21, 1972

3,651,018
USE OF A GERMANIUM-CONTAINING POLYCONDENSATION CATALYST IN THE PREPARATION OF POLYETHYLENE TEREPHTHALATE
Gerhard Schade, Witten-Bommern, and Franz Blaschke, Witten (Ruhr), Germany, assignors to Dynamit Nobel AG, Troisdorf, Germany
No Drawing. Filed Nov. 19, 1969, Ser. No. 878,183
Claims priority, application Germany, Nov. 28, 1968,
P 18 11 446.0
Int. Cl. C08g 17/015
U.S. Cl. 260—75 R                                6 Claims

ABSTRACT OF THE DISCLOSURE

A process for the preparation of polyethylene terephthalate by the polycondensation of oligomeric ethylene terephthalate. A glycolic solution of triethylammonium or tripropylammonium germanate is employed as the catalyst in the process. The catalyst is prepared by adding the respective trialkylamine to an aqueous-glycolic slurry of germanium dioxide.

BACKGROUND OF THE INVENTION

This invention relates to the preparation of polyethylene terephthalate. More particularly, it relates to a process for the preparation of polyethylene terephthalate by the polycondensation of oligomeric ethylene terephthalate. Even more particularly, the invention relates to the use of glycolic solutions of triethyl- or tripropylammonium germanates as catalysts in the described process.

The utilization of various germanium compounds as catalysts in the polycondensation reaction for the production of polyethylene terephthalate is known in the art. Among these known compounds are, on the one hand, germanium dioxide in the crystalline and amorphous state or solutions obtained by dissolving germanium dioxide in glycol and, on the other hand, organogermanium compounds or various esters of germanic acid. The catalytic effect of all of these compounds is remarkably satisfactory, although the compounds exhibit various disadvantages.

Germanium dioxide per se is soluble in glycol only to a very limited extent and is practically insoluble in the completely condensed polyethylene terephthalate. Consequently, when employing germanium dioxide as the catalyst, there is the danger that part of the catalyst is not dissolved right from the beginning and, accordingly, causes an undesired turbidity in the polyethylene terephthalate. When starting with separately produced solutions of germanium dioxide in glycol, the occurrence of turbidity after removing the glycol, which is employed in excess at the beginning, likewise cannot be avoided with certainty. Moreover, only very dilute (up to about 2.5% as a maximum) glycol solutions can be prepared so that the volumes of the catalyst solutions, in comparison to their catalytic efficiency, are inordinately large.

Although these disadvantages are not encountered when using the known organogermanium compounds and esters of germanic acid, these catalysts are obtainable only in a relatively complicated and, hence, very uneconomical manner. In contrast thereto, the process of this invention makes it possible to employ relatively highly concentrated catalyst solutions which are obtainable in a simple fashion. Moreover, the polyethylene terephthalates obtained with these catalyst solutions are completely free of turbid characteristics or opalescence phenomena.

One of the objects of the present invention is to provide a process for the preparation of polyethylene terephthalate which overcomes the disadvantages and deficiencies of the prior art.

Another object of the present invention is to provide a process for preparing polyethylene terephthalate which can be carried out readily and efficaciously using catalysts which can be obtained relatively easily.

A further object of the invention is to provide polyethylene terephthalate free of turbidity of opalesence problems.

A still further object of the invention is to provide a process for preparing polyethylene terephthalate which can be carried out on an industrial scale on an economical basis to give a high yield of product of good quality.

These and other objects and advantages of the present invention will become apparent to those skilled in the art from a consideration of the following specification and claims.

SUMMARY OF THE INVENTION

In accordance with the present invention, it has been found that the above objectives are met by using glycolic solutions of triethyl- or tripropylammonium germanates as the catalysts in a process for the preparation of polyethylene terephthalate. Suitably, these catalyst solutions are prepared by agitating a slurry of 1 part by weight of germanium dioxide in at least 9 parts by weight of ethylene glycol and the trialkylamine selected. In the case of triethylamine, for example, at least about 2 moles of amine are required per mole of germanium dioxide, preferably about 2-3 moles of amine per mole of germanium dioxide. In the case of tri-n-propyl- or triisopropylamine, about 4 moles of amine are necessary per mole of germanium dioxide, preferably about 4-5 moles of amine per mole of germanium dioxide.

If the starting materials employed are anhydrous, approximately 1-2 moles of water must additionally be utilized per mole of germanium dioxide. The agitation is advantageously conducted at temperatures close to the boiling point of the mixture or under reflux conditions.

The trialkylamines employed in the preparation of the catalyst in accordance with this invention should be practically free of primary and secondary amines as well as of ammonia or compounds which split off ammonia, since these compounds can have a disadvantageous effect on the color of the resultant polyesters.

The oligomeric ethylene terephthalates to be polycondensed in accordance with the invention are produced in a conventional manner, either by the esterification of terephthalic acid with excess ethylene glycol or by the interesterification of terephthalic acid esters, preferably dimethyl terephthalate, with excess ethylene glycol. The polycondensation reaction begins at a temperature of about 200° C. and is conducted at a temperature up to about 290° C. At least in the latter case, interesterification catalysts must be present, such as compounds of calcium, zinc, manganese, etc.; such catalysts are known in the art. The side effects of these compounds, undesirable during the subsequent polycondensation reaction, can likewise be eliminated in a conventional manner by the addition of phosphorus compounds after the interesterification reaction is terminated. In addition to these catalysts and stabilizers, further additives can be employed for the purpose of obtaining specific effects, as desired, such as substances having a dulling or frosting effect, coloring or pigmenting agents, anti-static agents, etc.

The catalysts employed in accordance with the invention are utilized in amounts such that the concentration of germanium dioxide is about 0.005–0.02% by weight, based on the amount of dimethyl terephthalate employed.

It is preferable to add the catalyst solution to the reaction mixture only after the latter has already been substantially freed of the non-esterified ethylene glycol, which is present in equilibrium therein, since germanium compounds generally promote the formation of di- and triglycols. The incorporation of di- and triglycols into the polyethylene terephthalate effects, in most cases, an undesirable lowering of the melting point. The addition is carried out to the molten, low-viscosity, preferably substantially glycol-free interesterification or esterification product. The final product is a viscous melt having a solidification point of about 250° C. In the normal case, this melt exhibits, at about 275–280° C., a melt viscosity of about 2,000–3,000 poises at a shearing gradient of 10 sec.$^{-1}$. The reduced viscosities to be attained are dictated, in the normal case, by the purpose for which the article is used and can range, for example, from about 0.75 to 1 and even higher. For endless fibers and films (e.g., "Melinex" or "Hostaphan"), the required values are about 0.80–0.85. In the case of staple fibers, the viscosity is about 0.75, and in case of tire cord, the viscosity is about 1 or greater.

EXAMPLES OF THE INVENTION

The following examples are given merely as illustrative of the present invention and are not to be considered as limiting. Unless otherwise noted, the percentages therein and throughout the application are by weight.

The polycondensates obtained in the examples are characterized by means of the following parameters.

The reduced viscosity $\eta_{red}$ is employed as the characteristic value for the degree of polycondensation, i.e., the degree of polymerization. The value for $\eta_{red}$ is calculated as follows:

$$\eta_{red} = \left(\frac{\text{Throughflow time of the solvent}}{\text{Throughflow time of the solution}}\right) - 1 \cdot \frac{1}{C}$$

The throughflow times are determined by means of a capillary viscosimeter. The solvent employed is a mixture of 60 parts by weight of phenol and 40 parts by weight of 1,1,2,2-tetrachloroethane. The measuring temperature is 25° C., and the concentration employed is 1 gram of polymer in 100 ml. of solvent.

The melting point of the resultant polymer is determined by heating a crystallized sample under a heating stage (platform) microscope, the heating rate being 0.8° C. per minute. The melting point is determined as being the temperature at which the last trace of a double refraction between crossed Nicol prisms disappears.

The color of the molten polyester is measured by means of a Lovibond Tintometer (a trade name of Tintometer Ltd., Salisbury, Great Britain) and is indicated in the values of the "Lovibond" scale. This scale consists of glass filter sets with linearly graduated permeability for the colors red, yellow and blue. By suitably combining these three subtractive primary colors, any desired color can be adjusted and specified numerically. The method employed is described in detail in two brochures of Tintometer Ltd. having the title of "Colorimetric Chemical Analytical Methods."

EXAMPLE 1

25 g. of germanium dioxide is heated in 225 g. of ethylene glycol containing 2.5 ml. of water to a temperature of 85° C. with agitation. To this slurry is gradually added 44 g. of triethylamine in the course of one hour, and the agitation is continued for another 4 hours at 85–95° C. After allowing the slurry to stand overnight, a clear solution is formed, the volume of which is 250 ml.

58.2 g. of dimethyl terephthalate is interesterified with 46.5 g. of ethylene glycol in the presence of 0.58 g. of calcium acetate and 0.029 g. of zinc acetate at temperatures of 180–220° C. until the cleavage of methanol therefrom is terminated. Thereafter, 0.15 g. of triphenyl phosphite is added thereto, the temperature is elevated to 250° C., and a vacuum of up to about 20 torr (mm. Hg) is applied until the main amount of the free glycol is distilled off. At this point, 0.2 ml. of the catalyst solution, prepared as described above, is added by means of a micro-burette. The temperature is increased to 275° C., and the pressure is lowered to 0.2 torr. Three hours after the addition of the catalyst solution, a polymer product is obtained having the following characteristics:

$\eta_{red}$—0.85
Melting point—266.5° C.
Color (Lovibond)—0.2 red; 0.9 yellow; 0.1 blue

EXAMPLE 2

The same procedure as that described in Example 1 is carried out with the difference that only 0.1 ml. of catalyst solution is employed, instead of the 0.2 ml. utilized in Example 1. The polyester product obtained 3 hours after the addition of the catalyst solution exhibits a reduced viscosity of 0.78, a melting point of 266° C. and a color according to the Lovibond scale of 0.1 red; 1.0 yellow; and 0.0 blue.

EXAMPLE 3

A stirrer-equipped vessel having a capacity of 40 liters and made of stainless steel is charged with 13.5 kg. of dimethyl terephthalate, 8.7 kg. of ethylene glycol and 3.4 g. of zinc acetate. The vessel is then purged with nitrogen. Thereafter, the vessel is heated up to a temperature of 220° C. in order to drive off the glycol-free methanol via a small column. The step of splitting off the methanol is terminated after 3.5 hours. Then, 3.4 g. of triphenyl phosphite is added thereto, the agitation is continued for 5 minutes, and the melt is transferred under pressure through a filtering candle into a second reactor of stainless steel having a volume of 40 liters and equipped with a stirrer. The latter reactor is previously preheated to 220° C. and is purged with nitrogen.

The product is now heated under agitation and a vacuum is applied, a vacuum of 20 torr. being reached at an internal temperature of 245° C. After the glycol, which reaches an equilibrium, has been substantially distilled off in this manner, 15 ml. of the catalyst solution described in Example 1 is introduced through a rather small dropping funnel. Thereafter, the internal temperature is raised to 280° C., and the internal pressure is lowered to 0.2–0.3 torr.

After 4¾ hours after the addition of the catalyst solution, the current consumption of the stirring unit reaches a value corresponding, on the basis of empirical experience, to a reduced viscosity of the polyester of about 0.85. At this point, the vacuum is removed by introducing nitrogen, the reactor content is discharged in a cord shape (rope form) through a bottom valve by applying nitrogen pressure, and the cords are cooled by means of water and then granulated.

After processing numerous charges one after the other in the same manner, the individual products, starting with the seventh charge, exhibit the following consistent properties:

$\eta_{red}$—0.84–0.86
Melting point—266–266.5° C.
Color (Lovibond)—0.1–0.2 red; 0.5–0.7 yellow; 0.0–0.1 blue.

The polyester products are all free of turbidities and of opalescence phenomena.

EXAMPLE 4

Five grams of germanium dioxide is heated in 45 ml. of ethylene glycol containing 0.5 g. of water to 100° C. under agitation, and 25 g. of tri-n-propylamine is added dropwise thereto. After agitating for about 2½ hours, a clear, yellowish solution is produced.

58.2 g. of dimethyl terephthalate is interesterified with 46.5 g. of ethylene glycol in the presence of 0.020 g. of managnese acetate [$(CH_3COO)_2Nn \cdot 4H_2O$]. At the final temperature of 220° C., 0.035 g. of triphenyl phosphite is added, and then the reaction mixture is heated under normal pressure to 280° C. until the splitting off of glycol is noticeably slowed down. At this point, 0.6 ml. of the above-described catalyst solution is added, and the pressure is gradually lowered to 0.2 torr. in correspondence with the distillation rate of the cleaved glycol. The reaction is terminated after 4 hours from the point of adding the catalyst solution to the mixture. The water-clear polycondensate, after cooling exhibits the following properties:

$\eta_{red}$—0.95
Melting point—266° C.
Color (Lovibond)—0.1 red; 0.7 yellow; 0.0 blue.

Practically the same results are obtained when employing triisopropylamine in place of tri-n-propylamine.

When using tri-n-butylamine, clear catalyst solutions can still be obtained if the concentration thereof is no more than 6 g. of germanium dioxide in 100 ml. of solution. The use of trialkylamines having still longer alkyl residues causes a further decrease in the glycol solubility of the germanium dioxide. Accordingly, the practical significance of such solutions is minor. In contrast thereto, it is possible to obtain more than 10 g. of GeO$_2$ in 100 ml. of solution by the addition of triethanolamine. However, polyethylene terephthalate produced therewith exhibits a branched structure and a markedly reduced melting point because of the concomitant condensation of triethanolamine, so that such polyesters have hardly any practical importance.

Hence, triethyl- and tripropylamines are employed in preparing the catalyst solutions in accordance with the present invention. The triethylamine, tri-n-propylamine or triisopropylamine is added, as discussed above, to aqueous-glycolic slurries of germanium dioxide in preparing the catalyst solutions of the invention.

The invention being thus described, it will be obvious that the same may be varied in many ways. Such variations are not to be regarded as a departure from the spirit and scope of the invention, and all such modifications as would be obvious to one skilled in the art are intended to be included herein.

It is claimed:

1. A process for the preparation of fiber- or film-forming polyethylene terephthalate which comprises polycondensing oligomeric ethylene terephthalate in the presence of a catalytic amount of an ethylene glycol solution of a germanium-containing polycondensation catalyst prepared by agitating a slurry of 1 part by weight of germanium dioxide in at least 9 parts by weight of ethylene glycol and a trialkylamine selected from the group consisting of triethylamine and tripropylamine at a temperature close to the boiling point of the resultant mixture or under reflux conditions, said slurry containing at least about 2 moles of triethylamine per mole of germanium dioxide or at least about 4 moles of tripropylamine per mole of germanium dioxide and said amines being substantially free of primary and secondary amines, ammonia, and compounds which split off ammonia.

2. The process of claim 1, wherein said slurry also contains about 1–2 moles of water per mole of germanium dioxide when the starting materials forming the slurry are anhydrous.

3. The process of claim 1, wherein the oligomeric ethylene terephthalate is obtained by the interesterification of dimethyl terephthalate with excess ethylene glycol and the amount of catalyst employed is sufficient to provide about 0.005 to 0.02% by weight of germanium dioxide, based on the amount of dimethyl terephthalate employed as a reactant with ethylene glycol.

4. A process for the preparation of fiber- or film-forming polyethylene terephthalate which comprises heating a reaction mixture comprising an oligomer of ethylene terephthalate in the presence of a catalytic amount of an ethylene glycol solution of a germanium-containing polycondensation catalyst, said catalyst being prepared by agitating a slurry of 1 part by weight of germanium dioxide in at least 9 parts by weight of ethylene glycol and a trialkylamine selected from the group consisting of triethylamine and tripropylamine at a temperature close to the boiling point of the resultant mixture or under reflux conditions, said slurry containing at least about 2 moles of triethylamine per mole of germanium dioxide or at least about 4 moles of tripropylamine per mole of germanium dioxide and said amines being substantially free of primary and secondary amines, ammonia, and compounds which split off ammonia, until the polyethylene terephthalate obtained has a reduced viscosity of at least about 0.75, said viscosity being measured at 25° C. with a concentration of 1 gram of polymer in 100 ml. of solvent consisting essentially of 60 parts by weight of phenol and 40 parts by weight of 1,1,2,2-tetrachloroethane.

5. The process of claim 4, wherein said slurry also contains about 1–2 moles of water per mole of germanium dioxide when the starting materials forming the slurry are anhydrous.

6. The process of claim 4, wherein the oligomeric ethylene terephthalate is obtained by the interesterification of dimethyl terephthalate with excess ethylene glycol and the amount of catalyst employed is sufficient to provide about 0.005 to 0.02% by weight of germanium dioxide, based on the amount of dimethyl terephthalate employed as a reactant with ethylene glycol.

References Cited
FOREIGN PATENTS
6606830  11/1966  Netherlands _____ 260—75 S WILLIAM H. SHORT, Primary Examiner L. P. QUAST, Assistant Examiner U.S. Cl. X.R.

252—430; 260—429 R